Nov. 30, 1943.   A. WALTHER   2,335,467
ELECTRICAL DRIVE FOR WHEEL TYPE PRESSES OR THE LIKE
Filed Jan. 16, 1941
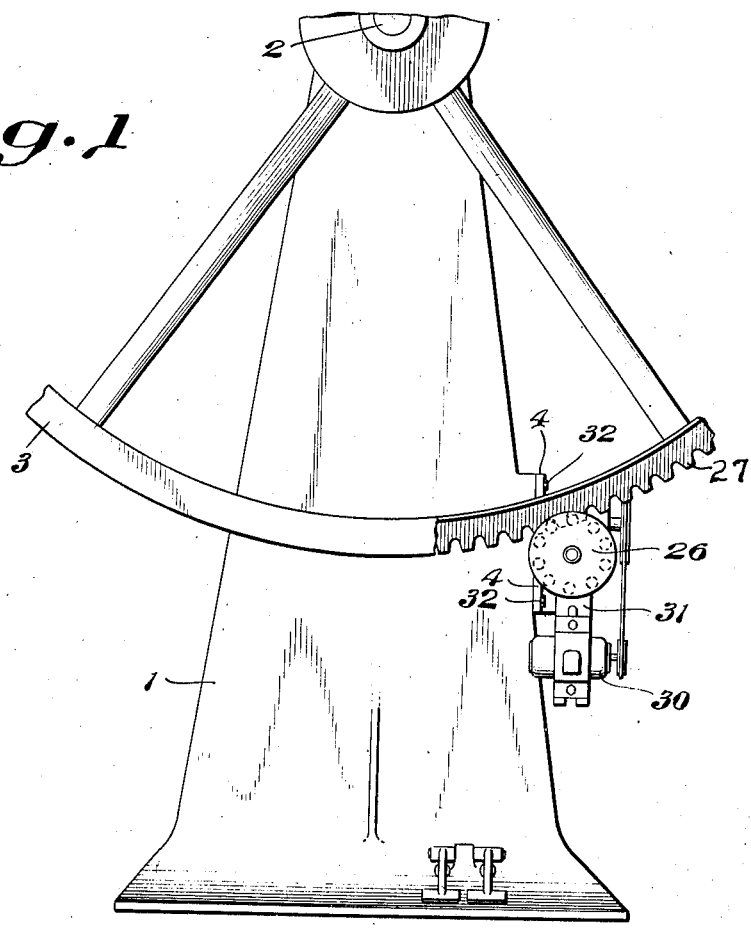
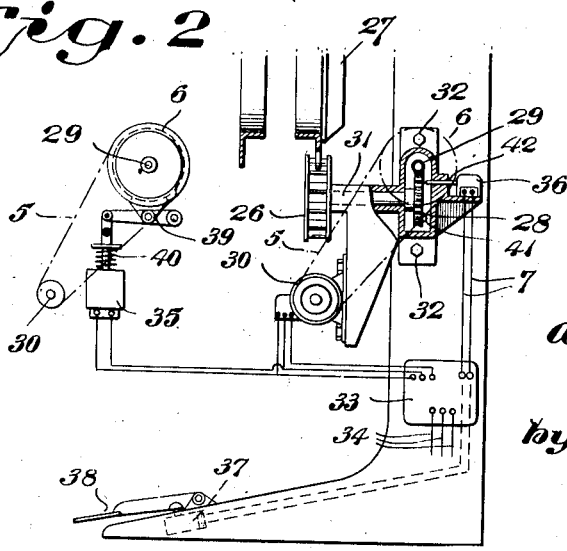
Inventor
August Walther
by [signature]
atty.

Patented Nov. 30, 1943

2,335,467

UNITED STATES PATENT OFFICE 2,335,467

ELECTRICAL DRIVE FOR WHEEL TYPE PRESSES OR THE LIKE

August Walther, Frankfort-on-the-Main-Oberrad, Germany; vested in the Alien Property Custodian Application January 16, 1941, Serial No. 374,724
In Germany April 26, 1940

1 Claim. (Cl. 192—142)

This invention relates to the drive of presses or the like which, particularly as in the case of wheel type presses for the cementing of boots and shoes, work by steps and whereby wheels of a relative great diameter are rotating.

In the case of wheel type cementing presses for boots and shoes, the wheel has been rotated either by hand or by power drive with special worm gears effecting the rotation of the wheel through the main axle, or chain drives have been used for this kind of drive.

This invention, now, comprises an efficient drive provided at the circumferential surface of the wheel having a toothed rim. The power drive situated directly at the wheel rim is preferably of the electrical type, therefore, requiring only a minimum of space, the electrical device allowing a simple wheel rotation by steps so that the hitherto arranged complicated cam clutches or the like operated by means of a foot lever, are avoided. Such clutches require with respect to the frequency of the reversing and braking operations, expensive devices and a substantial strain of the operator, whereas the electrical drive works completely automatically.

An example of the new drive for a wheel type press according to the invention is illustrated in the drawing.

Fig. 1 shows a wheel type press with the new drive but only with a part of the wheel, however without the pressing tools and their controls.

Fig. 2 shows the electrical arrangement of the drive.

On the pillar I of a wheel type cementing press, a wheel 3 is placed on axle 2, a toothed rim 27 being arranged at the circumference of the wheel and moved by means of a pin gear drive. On the side of the pillar I an electromotor 30 is fixed, and the gearing 26 with the housing 31 is mounted on the flanges 4.

The pin gear drive consists of a small electromotor 30, the gearing 26, 28, 29, the electrical brake 39 and the switch board 33. The motor 30 drives with the driving belt or chain 5 the wheel 6, the worm 29, the worm wheel 28, and the pin wheel 26 gearing with the toothed rim 27. Thus, the most efficient working point at the largest lever-arm is given making possible to use an extremely small motor power. The combined pin wheel gear is fixed on the pillar I only by means of two screw bolts 32 and may, therefore, be easily detached and packed in composite state, being protected by casing 31 against outer disturbing influences.

In Fig. 2 the electrical arrangement is represented effecting the connections by means of the switch board 33, to the foot lever 38, motor 30, contact switch 36, and the brake magnet 35.

The foot lever 38 causes through contact 37 the connection to the switch board 33 supplied with current by the main conductors or feeders 34. The electrical brake comprises a brake magnet 35 with a compression spring 40 and the brake shoe 39. In case the brake magnet is dead, the spring 40 presses the brake shoe 39 onto the brake wheel 6 fitted on the worm shaft 29.

The contact switch 36 has a spring actuated switch pin 42 disposed in the conductor line 7 and controlled by means of a cam 41 on the worm wheel 28.

Starting the machine or the wheel I respectively, the operator presses the foot lever 38 down and closes thereby the contact 37 whereby at first the brake magnet 35 being excited over the switch board 33 and, then, the brake 39 is released against the pressure of spring 40. At the same time, the motor 30 is started, thus turning the wheel I by means of the transmission. The wheel having now proceeded about one field with the press points arranged on it, the cam 41 runs upon the pin 42 and displaces it against the spring action so that the current is interrupted. The brake 39 is then applied at once by the action of spring 40; i. e. the motor 30 and the wheel I are thus quickly brought to the rest. The new press member is served, and a new play of the wheel movement may begin with the pressing down of the foot lever 38.

In case a certain number of press members being omitted, the foot lever 38 should be left pressed down until the desired press member arrives, as the wheel continues revolving without stopping.

What I claim is:

In a wheel type press for cementing boots and shoes having a supporting pillar upon which is rotatably mounted a press operating wheel which has a tooth peripherial rim, the combination with said pillar and said wheel of a supporting flange on said pillar presenting a substantially flat vertical surface, a clamping member having a central shell carrying a horizontal bearing and a pair of supporting eyes through which stud bolts extend and are threaded into the said flange, shaft means supported in said bearing and having a free end which carries a gear having teeth engaging the toothed rim of said wheel, said gear comprising a pair of disks held in spaced relationship and having extending therebetween a peripherial row of cylindrical members which constitute the teeth of the gear, a motor mechanically connected to drive said shaft and thus drive said wheel through said gear, a foot-lever switch assembly which is closed by operation of a foot lever and which is electrically connected to control the starting of said motor, brake means electrically connected and controlled to be applied upon the de-energization of said motor and to be released upon the energization of said motor, cam means carried by said shaft, a sliding pin positioned parallel to said shaft and having an end cam portion which is engaged by said cam means when said shaft is in a predetermined position thereby to slide said pin axially, switch means which is operated by the axial movement of said pin, a control panel assembly including relay means and connecting the switches of the control circuit and the source of electrical power to start the operation of said motor and release said brake upon the operation of said foot lever and to stop said motor and apply said brake upon the operation of said switch by said pin.

AUGUST WALTHER.